United States Patent
Hidaka

(10) Patent No.: US 8,401,065 B2
(45) Date of Patent: Mar. 19, 2013

(54) CLOCK RECOVERY CIRCUIT FOR RECEIVER USING DECISION FEEDBACK EQUALIZER

(75) Inventor: Yasuo Hidaka, Cupertino, CA (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/027,265

(22) Filed: Feb. 14, 2011

(65) Prior Publication Data

US 2012/0207204 A1    Aug. 16, 2012

(51) Int. Cl.
*H03H 7/30* (2006.01)
(52) U.S. Cl. ......................................... 375/233
(58) Field of Classification Search .................... None
See application file for complete search history.

(56) References Cited

U.S. PATENT DOCUMENTS

| | | | |
|---|---|---|---|
| 4,298,983 A | 11/1981 | Kawai | |
| 2001/0050593 A1 | 12/2001 | Brambilla | |
| 2004/0165682 A1* | 8/2004 | Jun | 375/326 |
| 2007/0280343 A1* | 12/2007 | Bau et al. | 375/233 |
| 2010/0238993 A1* | 9/2010 | Huang et al. | 375/233 |

OTHER PUBLICATIONS

Hidaka et al ("A 4-channel 10.3Gb/s backplane transceiver macro with 35dB equalizer and sign-based zero-forcing adaptive control", Solid-State Circuits Conference—Digest of Technical Papers, 2009. ISSCC 2009. IEEE International, Feb. 8-12, 2009, pp. 188-189,189a).*
U.S. Appl. No. 13/027,258, filed Feb. 14, 2011, Yasuo Hidaka.
U.S. Appl. No. 13/027,262, filed Feb. 14, 2011, Yasuo Hidaka.
R.W. Lucky, "Automatic Equalization for Digital Communication", The Bell System Technical Journal, vol. XLIV, Apr. 1965, No. 4.
Bernard Widrow, John M. McCool, Michael G. Larimore, and C. Richard Johnson, Jr., Stationary and Nonstationary Learning Characteristics of the LMS Adaptive Filter, Proceedings of the IEEE, vol. 64, No. 8, Aug. 1976.
Bruce A. Cochran and James A. Cadzow, Linear Recursive Adaptive Equalization Utilizing a Modified Gauss-Newton Algorithm, IEEE Transactions on Circuits and Systems, vol. CAS-34, No. 7, Jul. 1987.
Soura Dasgupta, C. Richard Johnson, Jr., and A. Maylar Baksho, "Sign-Sign LMS Convergence with Independent Stochastic Inputs", IEEE Transactions on Information Theory, vol. 36, No. 1, Jan. 1990.
Jan W.M. Bergmans, "Digital Baseband Transmission and Recording", Kluwer Academic Publishers, ISBN 0-7923-9775-4, Dordrecht, The Netherlands, 1996.
Office Action for U.S. Appl. No. 13/027,258, Apr. 12, 2012.
Response to Final Office Action for U.S. Appl. No. 13/027,258, Nov. 26, 2012.
Non-Final Office Action for U.S. Appl. No. 13/027,258, Jul. 12, 2012.
USPTO, Final Office Action for U.S. Appl. No. 13/027,258, Sep. 24, 2012.
USPTO, Nonfinal Office Action for U.S. Appl. No. 13/027,258, Dec. 13, 2012.

* cited by examiner

*Primary Examiner* — Leon-Viet Nguyen
(74) *Attorney, Agent, or Firm* — Baker Botts L.L.P.

(57) ABSTRACT

In particular embodiments, a method includes receiving by a decision feedback equalizer (DFE) a first signal comprising transmitted data; adjusting by the DFE the first signal to an equalized signal comprising the transmitted data; detecting by a phase-error detector phase errors at a data rate of no more than one fourth of a data rate for the transmitted data; generating by the phase-error detector a phase-error level based on the detected phase errors; and recovering, by a clock-recovery circuit for the DFE and the phase-error detector, a clock signal associated with the transmitted data based on the phase error level.

6 Claims, 15 Drawing Sheets

| Pattern (period) | Frequency | Phase | |
|---|---|---|---|
| | | Insufficient equalization | Excessive equalization |
| 0*8 / 1*8 (16UI) | Low | Early | Late |
| 00001111 (8UI) | | | |
| 00110011 (4UI) | High | Late | Early |
| 01010101 (2UI) | Very high | To be ignored, unless amplitude is equalized | |

$C_0 > 0$
$C_1 < 0$

CLOCK RECOVERY CIRCUIT FOR RECEIVER USING DECISION FEEDBACK EQUALIZER

TECHNICAL FIELD

This disclosure relates generally to high-speed communication.

BACKGROUND

In high-speed electrical communication, a received signal is often distorted due to frequency-dependent loss, such as for example skin effect and dielectric loss, causing inter-symbol interference (ISI). Equalizers are often used to compensate for ISI to increase maximal channel length or increase communication speed.

DESCRIPTION OF EXAMPLE EMBODIMENTS

Figure 1:
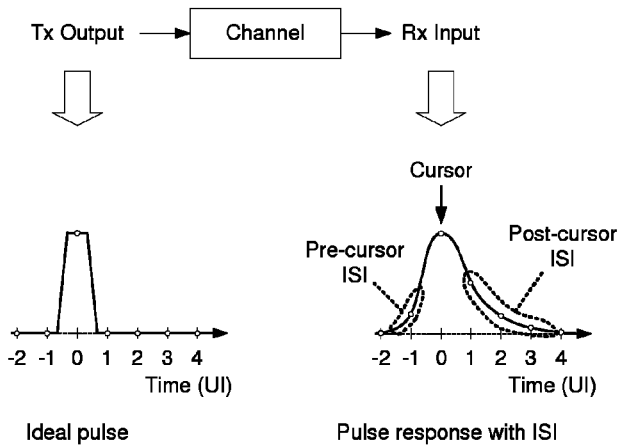
FIG. 1 illustrates an example pulse response of a channel with example ISI.

In high-speed electrical communication, a received signal is often distorted due to frequency-dependent loss such as skin effect and dielectric loss, which may cause inter-symbol interference (ISI). FIG. 1 illustrates an example pulse response of a channel with example ISI. The pulse response includes a peak pulse response (cursor), ISI before the cursor (pre-cursor ISI), and ISI after the cursor (post-cursor ISI). Both pre-cursor ISI and post-cursor ISI may interfere with the reception of adjacent bits and degrade bit error rate (BER). As channel length increases, the pulse response may spread more widely in time, causing higher ISI. As data rate increases, although the ideal pulse width at transmission side (or Tx) output decreases, the pulse width at the receiving side (or Rx) input does not change much in the absolute time scale. Since the unit interval (UI) decreases as the data rate increases, ISI effectively increases.

Equalizers are often used to compensate for ISI to increase maximal channel length or increase communication speed. In general, an equalizer is a filter which approximates a reverse function of the channel transfer function to cancel distortion by the channel. The equalizer may be a linear equalizer (LE), a decision-feedback equalizer (DFE), or a combination of LE and DFE.

Figure 2:
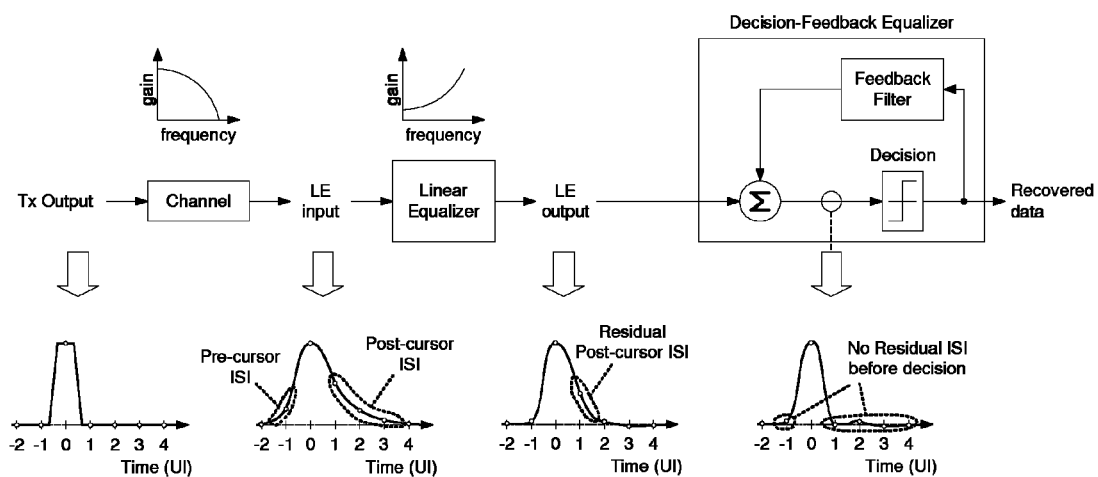
FIG. 2 illustrates an example equalizer.

FIG. 2 illustrates an example equalizer. The LE input may have pre-cursor ISI and post-cursor ISI due to high-frequency attenuation in the channel. The LE amplifies the attenuated high-frequency components to cancel pre-cursor ISI and part of post-cursor ISI. Residual ISI at the DFE input is emulated by a feedback filter in the DFE using decision circuit outputs. The emulated ISI is subtracted from the DFE input signal so that the ISI may be completely cancelled at the decision circuit input.

If there were no DFE, the LE could in particular embodiments cancel all post-cursor ISI, but an LE-only scheme has the drawback of tending to amplify high-frequency noise. In FIG. 2, with a DFE following the LE, the LE may leave some post-cursor ISI which is cancelled by the DFE. Since the decision circuit removes the noise, the emulated ISI is substantially noiseless. Hence, the advantage of a DFE is that it substantially cancels ISI without amplifying noise. However, the DFE has limited capability to cancel ISI, because each tap of the feedback filter may emulate ISI for only a time span of only one unit interval (UI). Moreover, the DFE cannot substantially cancel the pre-cursor ISI, because the DFE emulates ISI using prior decisions. Another drawback of the DFE is error propagation; once there is an error in recovered data, the error is likely to happen again in successive data due to wrong feedback by the DFE.

LE characteristics are represented by a transfer function in the discrete-time domain or continuous-time domain. An LE in the discrete-time domain is either a finite-impulse-response (FIR) filter or an infinite-impulse-response (IIR) filter.

An LE in the continuous-time domain is a continuous-time linear equalizer (CTLE). An LE may be a combination of an FIR filter, an IIR filter, and a CTLE.

Although the LE is on the Rx side in FIG. 2, it may be placed on the Tx side so that the signal is pre-distorted before transmission. As an alternative, it may be split to both the Tx and Rx sides. On the other hand, the DFE should be on the Rx side, because the DFE uses data values that are received immediately before.

Figure 3:
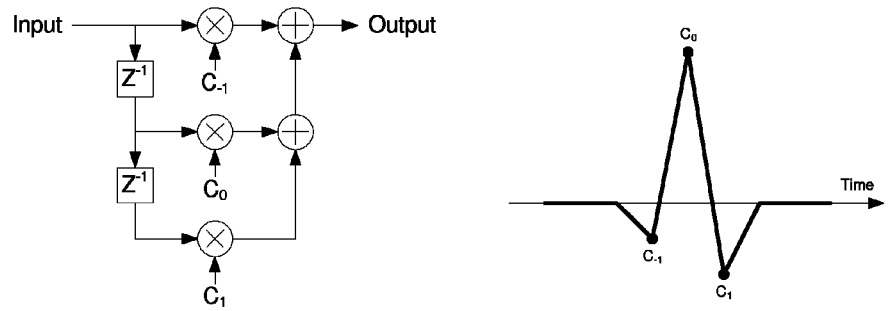
FIG. 3 illustrates an example 3-tap finite-impulse-response (FIR) filter with one pre-cursor tap and one post-cursor tap.

FIG. 3 illustrates an example 3-tap FIR filter with one pre-cursor tap and one post-cursor tap. In FIG. 3, $Z^{-1}$ represents a unit delay. $C_0$ is the cursor-tap coefficient with the maximum magnitude among the tap coefficients. The cursor tap is also called the center tap or the main tap. $C_{-1}$ is the pre-cursor tap coefficient that primarily cancels the pre-cursor ISI. $C_1$ is the post-cursor tap coefficient that primarily cancels the post-cursor ISI. In particular embodiments, it may be desirable to have the coefficients automatically adapt to the channel characteristics because the channel characteristics may be unknown.

Figure 4:
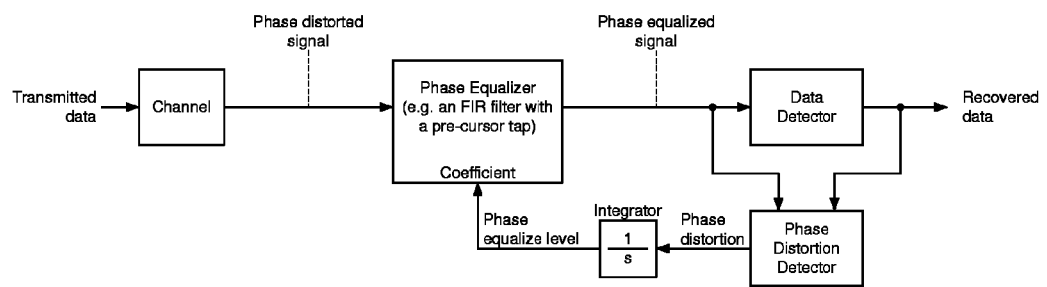
FIG. 4 illustrates an example adaptive phase-equalizer system.

FIG. 4 illustrates an example adaptive phase-equalizer system. In FIG. 4, the transmitted signal may be phase distorted during transmission over the channel. In particular embodiments, the phase-distorted signal may be phase-equalized by a phase equalizer such as an FIR filter with a pre-cursor tap to generate a phase-equalized signal. In particular embodiments, a data detector may recover transmitted data from the phase-equalized signal. In particular embodiments, the phase-distortion detector may check the data-detector input with the data-detector output to detect residual phase distortion in the data-detector input. In particular embodiments, the residual phase distortion may be integrated by an integrator to generate a phase-equalize level. In particular embodiments, the phase-equalize level may be used as a coefficient of the phase equalizer. In particular embodiments, the adaptive phase-equalizer system may include an amplitude equalizer. In particular embodiments, the phase equalizer may equalize amplitude distortion as well as phase distortion and the data detector may include a DFE.

Figure 5:
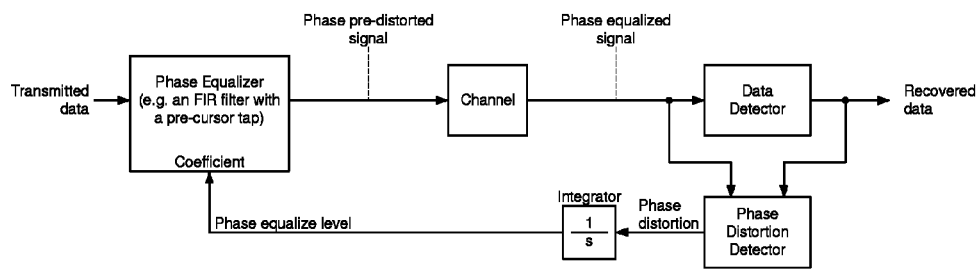
FIG. 5 illustrates another example adaptive phase-equalizer system.

In particular embodiments, the phase equalizer of the adaptive phase-equalizer system may be placed on the Tx side, as FIG. 5 illustrates. The phase equalizer may pre-distort the signal before its transmission over the channel so it may be phase-equalized at the channel output. A backward channel may be required to transfer the coefficient control information back to Tx side. In particular embodiments, the functionality of the phase equalizer may be split between Tx and Rx.

Figure 6:
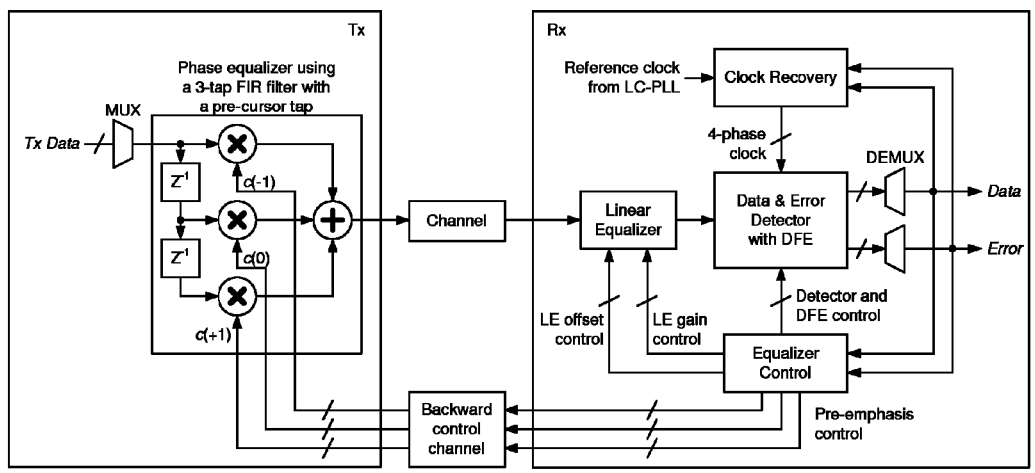
FIG. 6 illustrates another example adaptive phase-equalizer system.

FIG. 6 illustrates another example adaptive phase-equalizer system. As FIG. 6 illustrates, the phase-equalizer circuit may be realized by a 3-tap FIR filter with a pre-cursor tap on the Tx side. The Rx side may have a linear equalizer, a data and error detector with DFE, a de-multiplexer, clock-recovery circuits, and equalizer-control circuits. In particular embodiments, the equalizer control may generate LE controls, detector and DFE control, and pre-emphasis control. In particular embodiments, information for the pre-emphasis control may be transferred back to the Tx side through a backward control channel. In FIG. 6, Data is data recovered from the received signal and Error is error information for clock recovery and equalizer control.

Figure 7:
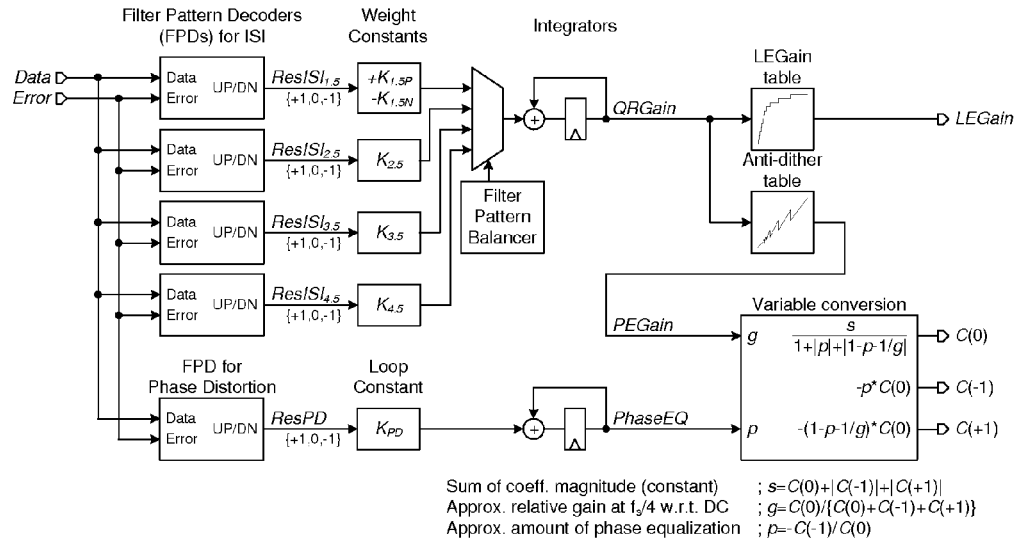
FIG. 7 illustrates an example adaptive control for linear equalizer gain and pre-emphasis coefficients of an example 3-tap FIR filter.

FIG. 7 illustrates an example adaptive control for LE gain and pre-emphasis coefficients of 3-tap FIR filter. In particular embodiments, filter-pattern decoders (FPDs) for ISI may detect residual ISI and generate ResISI signals at four time steps as described in U.S. Patent Application No. 2009/0316767, entitled Detecting Residual Intersymbol Interference (ISI) Components Using Two Data Patterns, which is incorporated herein by reference as an example and not by way of limitation. In particular embodiments, the ResISI signals at four time steps may be multiplied with weight constants, selected by a filter pattern balancer, and integrated to generate QRGain, which represents the gain of the linear equalizers at a quarter rate relative to DC. In particular embodiments, convergence may force the weighted sum of the average of ResISI signals to zero, as described in U.S. Patent Application No. 2009/0316771, entitled Sign-Based General Zero-Forcing Adaptive Equalizer Control, which is incorporated herein by reference as an example and not by way of limitation. In particular embodiments, a single control loop may be shared between the Rx linear equalizer and Tx pre-emphasis to equalize their strengths and avoid coupling between two similar control loops. In particular embodiments, QRGain may be translated to LEGain and PEGain by table look-up, with anti-dithering embedded in the PEGain table.

The bottom path of FIG. 7 illustrates examples of the phase-distortion detector and the integrator that FIG. 4 and FIG. 5 illustrate. In particular embodiments, the FPD for the phase-distortion circuit may detect residual phase distortion and generate ResPD, representing phase distortion. In particular embodiments, ResPD may be integrated to PhaseEQ, representing the required level of phase equalization. In particular embodiments, convergence may force ResPD to zero.

Particular embodiments define PEGain as $C(0)/\{C(0)+C(-1)+C(+1)\}$ which may approximate relative gain at quarter rate with respect to DC. Particular embodiments define PhaseEQ as $-C(-1)/C(0)$ which may approximate amount of phase equalization. In particular embodiments, $C(0)$, $C(-1)$ and $C(+1)$ may be derived from PEGain and PhaseEQ using constraints on coefficient signs and a constant sum of coefficient magnitude.

Figure 8:
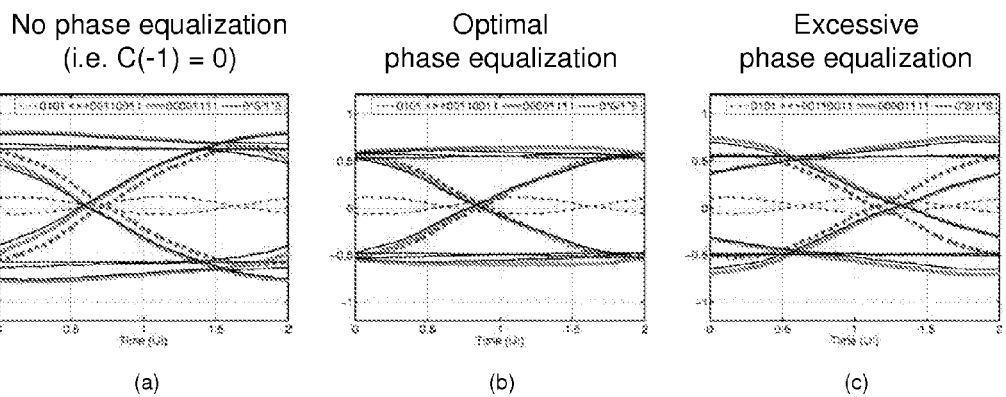
FIG. 8 illustrates example effects of example phase equalization.

FIG. 8 illustrates example effects of example phase equalization. In FIG. 8, periodic wave forms with various periods are measured at the input of a 1-tap DFE on the Rx side after transmission over a channel with 32 dB loss at the Nyquist frequency. Amplitude equalization may be optimal for the 1-tap DFE, but phase equalization may be different. Although an amplitude pattern of 0101 is not recovered, this is not necessarily a problem for data recovery using a DFE, as the DFE recovers the Nyquist frequency component.

With no phase equalization, a 4UI periodic pattern (00110011) comes later than 8UI (00001111) and 16UI (0*8/1*8) patterns. This is the case when the pre-cursor tap is not used. With substantially optimal phase equalization, 4UI, 8UI, and 16UI patterns are well aligned. With excessive phase equalization, a 4UI pattern comes earlier than 8UI and 16UI patterns. In FIG. 8, time lines are aligned between diagrams. As phase equalization increases, 4UI, 8UI, and 16UI patterns are delayed at different rates, but a 2UI periodic pattern (0101) is not delayed, because its pre-cursor tap is substantially the same as its post-cursor tap. As a result, with optimal phase equalization, the 0101 pattern is out of phase with the other patterns. Again, this is not a problem for data recovery using a DFE, as the DFE recovers the Nyquist frequency component.

Figures 9, 10:
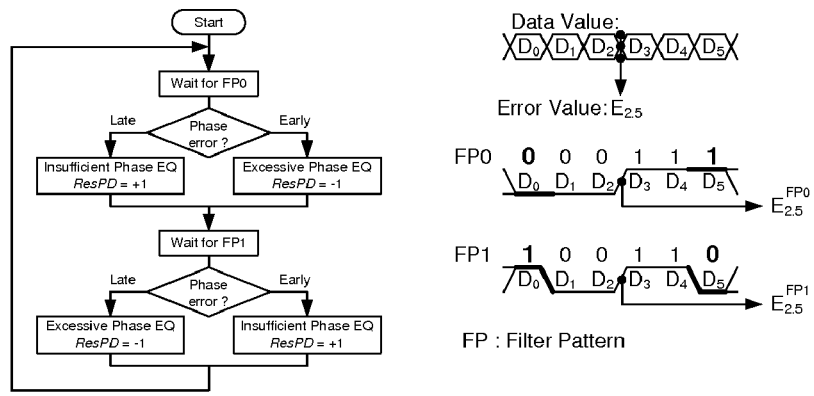
FIG. 9 illustrates example phase distortion.
FIG. 10 illustrates an example filter-pattern decoder (FPD) for detecting frequency-dependent phase between $f_s/4$ and $f_s/6$.

Based on FIG. 8, particular embodiments may define phase distortion as frequency-dependent phase, as FIG. 9 illustrates. If phase equalization is insufficient, low-frequency patterns (e.g. 16UI or 8UI periodic patterns) may have early phase, whereas high-frequency patterns (e.g. 4UI periodic patterns) may have late phase. If phase equalization is excessive, low-frequency patterns may have late phase, whereas high-frequency patterns may have early phase. Very-high-frequency pattern s (e.g. 2UI periodic patterns) may be substantially ignored, unless amplitude is equalized.

FIG. 10 illustrates an example FPD for detecting frequency-dependent phase between $f_s/4$ and $f_s/6$. Particular embodiments may detect phase distortion by comparing phase error at filter patterns of FP0 (000E111) and FP1 (100E110), with E denoting the location of a rising edge. In particular embodiments, inverted patterns with falling edges, e.g. 111E000 and 011E001, may be used. In FIG. 10, FP0 may represent low frequency patterns with a period of at least 6UI and FP1 may represent high-frequency patterns with a period of 4UI.

In FIG. 10, if phase error is late at FP0 and early at FP1, ResPD may be assigned +1, indicating insufficient phase equalization. If phase error is early at FP0 and late at FP1, ResPD may be assigned −1, indicating excessive phase equalization.

In FIG. 10, if phase error is early for both FP0 and FP1 or late for both FP0 and FP1, ResPD may be assigned +1 and −1 to generate zero average output. In particular embodiments, to make sure the average ResPD becomes completely zero in such a condition regardless of statistics of received data sequence, FPD may alternately check each filter pattern for the same number of times.

The FPD for phase distortion in FIG. 10 may perform detection of two ISI components for time indexes of +2.5UI and −2.5UI, while at the same time using opposite polarities. As an example and not by way of limitation, the effect from $D_0$ to $E_{2.5}$ may be post-cursor ISI at a time index of +2.5UI, whereas the effect from $D_5$ to $E_{2.5}$ may be pre-cursor ISI at a time index of −2.5UI. ResPD may be associated positively with pre-cursor ISI and negatively with the post-cursor ISI. In particular embodiments, the phase distortion may be detected as an imbalance between pre-cursor ISI and post-cursor ISI, such as between time indices of +2.5UI and −2.5UI.

Figure 11:
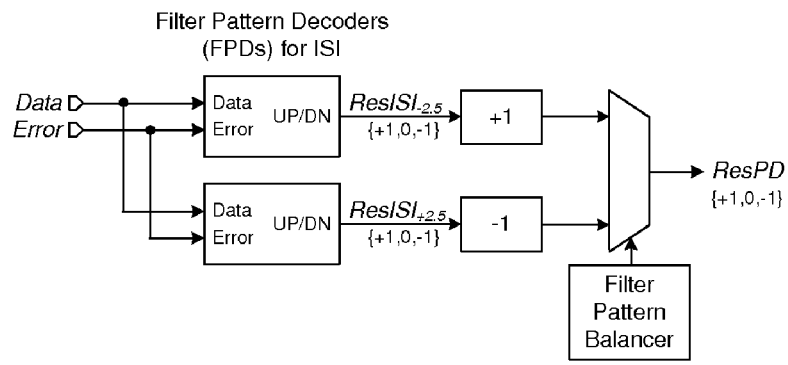
FIG. 11 illustrates an example phase-distortion detector.

Particular embodiments may implement the phase-distortion detector with multiple FPDs for ISI, as FIG. 11 illustrates. In FIG. 11, the FPD for $ResISI_{−2.5}$ may detect residual pre-cursor ISI at a time index of −2.5UI and the FPD for $ResISI_{+2.5}$ may detect residual post-cursor ISI at a time index of +2.5UI. In particular embodiments, residual pre-cursor ISI at a time index of −2.5UI and residual post-cursor ISI at a time index of +2.5UI may be weighted in opposite polarity and equally selected by a filter-pattern balancer to generate the signal ResPD.

Figure 12:
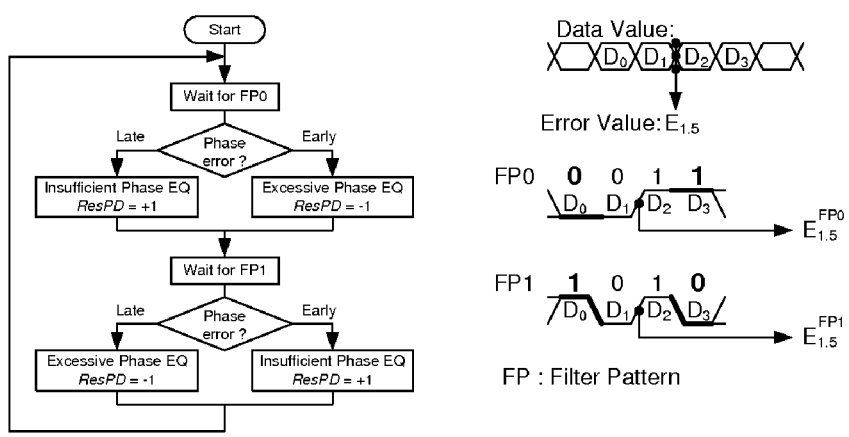
FIG. 12 illustrates an example FPD for detecting frequency-dependent phase between $f_s/2$ and $f_s/4$.
Figure 13:
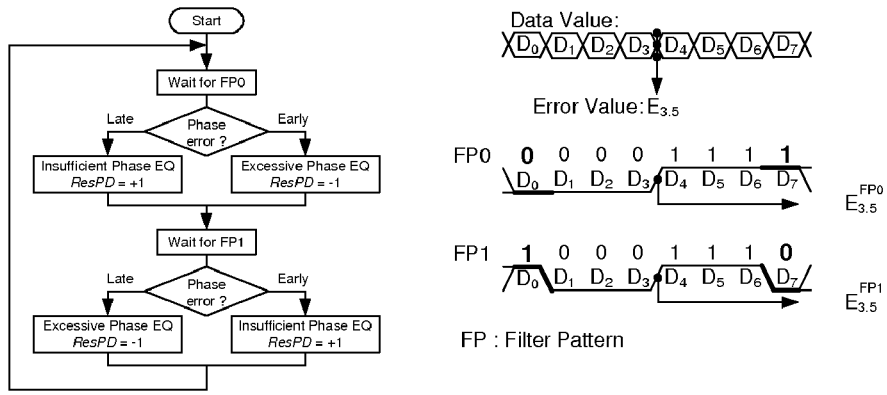
FIG. 13 illustrates an example FPD for detecting frequency-dependent phase between $f_s/6$ and $f_s/8$.

FIG. 12 illustrates an example FPD for detecting frequency-dependent phase between $f_s/2$ and $f_s/4$. In FIG. 12, the FPD for pre-cursor ISI may detect residual pre-cursor ISI at a time index of −1.5UI and the FPD for post-cursor ISI may detect residual post-cursor ISI at a time index of +1.5UI. Particular embodiments may detect phase distortion in frequencies lower than $f_s/4$, as FIG. 13 illustrates. In FIG. 13, the phase distortion may be detected as frequency dependent phase between $f_s/6$ and $f_s/8$.

Figure 14:
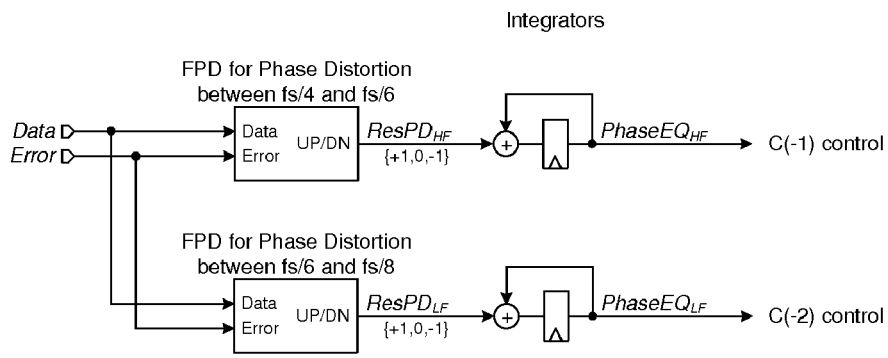
FIG. 14 illustrates an example multi-dimensional phase-distortion detector using multiple FPDs, one for detecting frequency-dependent phase between $f_s/4$ and $f_s/6$ and another for detecting frequency-dependent phase between $f_s/6$ and $f_s/8$.

Particular embodiments may use two or more FPDs (such as for example the FPDs in FIG. 10 and FIG. 13) together to control a multi-dimensional phase equalizer such as an FIR filter with two or more pre-cursor taps, as FIG. 14 illustrates as an example and not by way of limitation. In FIG. 14, the FPD for phase distortion between $f_s/4$ and $f_s/6$ (or high-frequency phase distortion) may be used to control the first pre-cursor tap C(−1) and the FPD for phase distortion between $f_s/6$ and $f_s/8$ (or low-frequency phase distortion) may be used to control the second pre-cursor tap C(−2). Particular embodiments may extend to a three-dimensional (or higher) phase equalizer.

Figure 15:
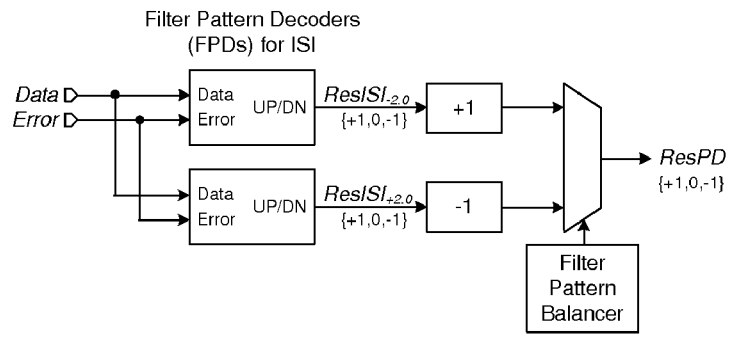
FIG. 15 illustrates an example phase-distortion detector using multiple FPDs for inter-symbol interference based on errors sampled by a data clock.

Particular embodiments may also detect phase distortion from error information sampled by the data clock, rather than the edge clock. FIG. 15 illustrates an example phase-distortion detector using two FPDs for ISI based on errors sampled by a data clock. In FIG. 15, the FPD for $ResISI_{−2.0}$ may detect residual pre-cursor ISI at a time index of −2.0UI and the FPD for $ResISI_{+2.0}$ may detect residual post-cursor ISI at a time index of +2.0UI. In particular embodiments, residual pre-cursor ISI at a time index of −2.0UI and residual post-cursor ISI at a time index of +2.0UI may be weighted in opposite polarity and equally selected by a filter-pattern balancer to generate the signal ResPD.

Figure 16:
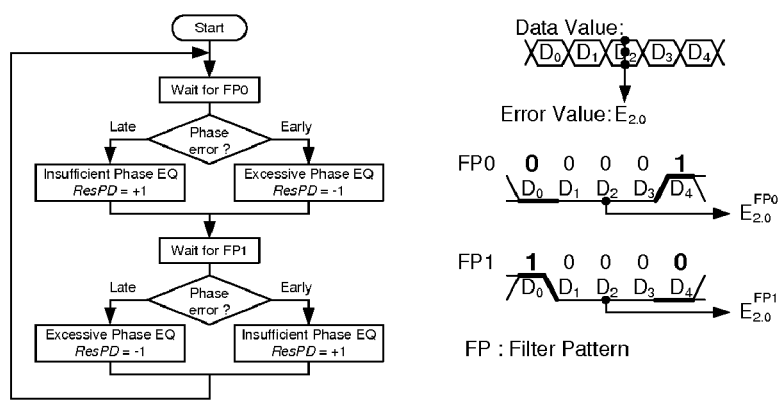
FIG. 16 illustrates an example FPD for phase distortion based on error information sampled by a data clock.

As an alternative to the example phase-distortion detector of FIG. 15, an FPD may directly detect phase distortion from error information sampled by data clock, as FIG. 16 illustrates. The example method of FIG. 16 is substantially equivalent to the example phase-distortion detection of FIG. 15, as the example method of FIG. 16 may detect ResISI−2.0 and ResISI+2.0 together at the same time in opposite polarity.

As FIG. 8 illustrates, although the phase may be matched between 4UI, 8UI, and 16UI periodic patterns, the 2UI periodic pattern, e.g. 0101, may be out of phase with the other patterns. Although this is not a problem for data recovery using a DFE, because the DFE recovers the Nyquist frequency component, it may be a problem for a conventional clock-recovery scheme that uses phase-error information at any data transition, because misaligned phase of a 0101 pattern may cause data-dependent jitter (which degrades receiver jitter tolerance).

Figure 17:
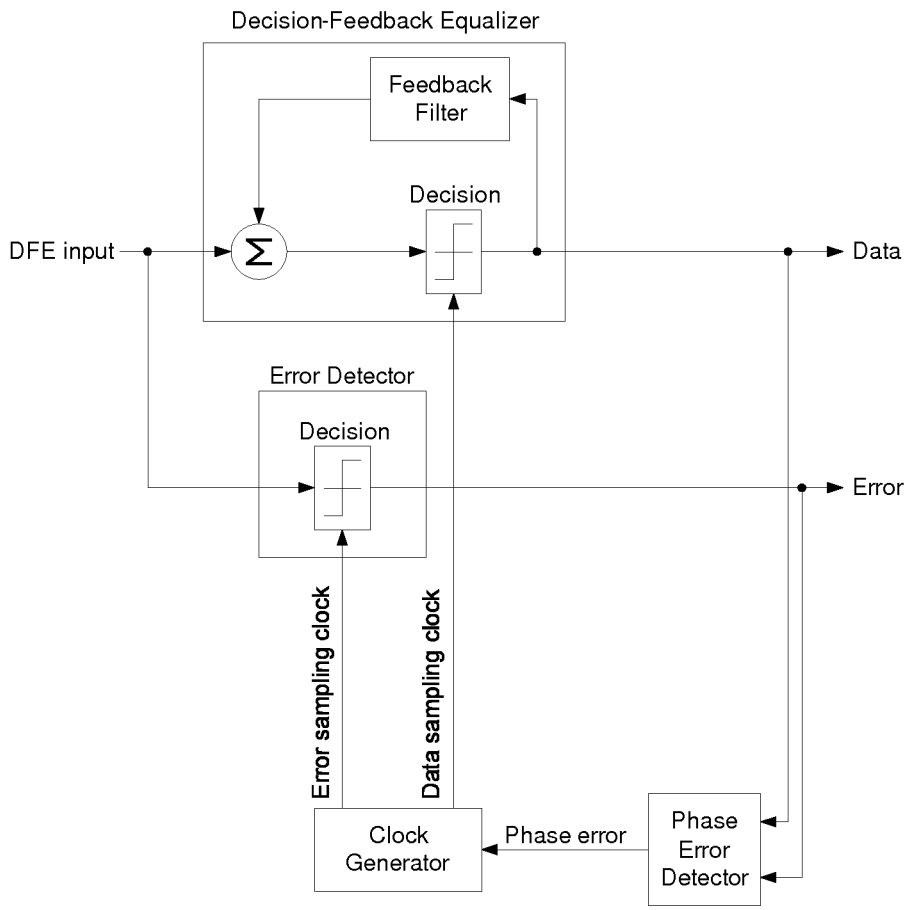
FIG. 17 illustrates a clock-recovery method for a decision-feedback equalizer (DFE).
Figure 18:
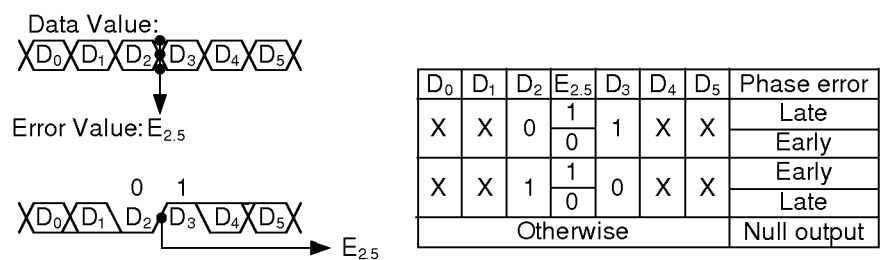
FIG. 18 illustrates a phase-error detector.

FIG. 17 illustrates a clock-recovery method for DFE, and FIG. 18 illustrates a phase-error detector. The phase error is detected whenever there is a data transition from $D_2$ to $D_3$ by comparing the error value $E_{2.5}$ between $D_2$ and $D_3$ with $D_2$ and $D_3$ as illustrated in FIG. 18.

Figure 19:
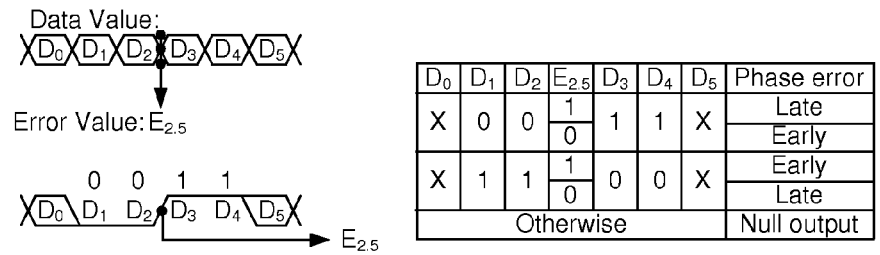
FIG. 19 illustrates an example phase-error detector for an example clock-recovery method for an example decision-feedback equalizer (DFE).

FIG. 19 illustrates an example phase-error detector for an example clock-recovery method for an example DFE. In particular embodiments, clock recovery may use phase-error information at 00E11 (or 11E00) patterns and ignore phase-error information at other patterns, e.g., the example method of FIG. 19 may use phase-error information at a quarter-rate or lower frequency. In particular embodiments, the example method of FIG. 19 may have advantages over other clock recovery methods because (1) the amplitude of a 10E10 pattern may be too small, (2) the phase of a 10E10 pattern may not be aligned with other low-frequency patterns, (3) locking clock phase on a 00E11 pattern may improve sensitivity to detect phase distortion with the example method of FIG. 19, or (4) the example method of FIG. 19 may make clock recovery more tolerant for DFE error propagation than other clock-recovery methods. Other clock-recovery methods are often prone to DFE error-propagation, as DFE error-propagation may continue with a 1010 pattern, generating wrong phase-error information, whereas DFE error-propagation may cease at low-frequency patterns, such as two or more contiguous bits of the same value.

Figure 20:
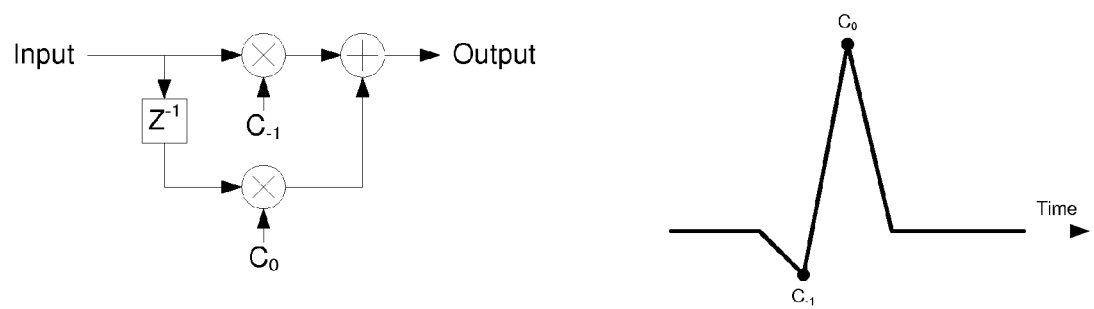
FIG. 20 illustrates an example 2-tap FIR filter with one pre-cursor tap.

In FIG. 4 and FIG. 5, a linear filter (an FIR filter, a CTLE, or a combination of them) with a non-minimum-phase characteristics may be used as the phase equalizer. In particular embodiments, a linear filter may have non-minimum-phase characteristics and its transfer function may have one or more zeros or poles in the discrete-time domain outside the unit circle in the z plane or one or more zeros or poles in the continuous-time domain on the right half of the s plane. For example, a 2-tap FIR filter with one pre-cursor tap as FIG. 20 illustrates as an example and not by way of limitation may have the following transfer function in the discrete-time domain:

$$G(z) = C_{-1} + C_0 \cdot Z^{-1} = \frac{C_{-1}\left(Z - \frac{C_0}{-C_{-1}}\right)}{Z} \quad \text{EQ 1}$$

As an example and not by way of limitation, the transfer function EQ1 may have one zero at $$\frac{C_0}{-C_{-1}}$$

and one pole at the origin. The zero may be outside the unit circle in the z plane if $|C_0|>|C_{-1}|$, where $C_0$ is the cursor tap. Therefore, as long as $C_{-1}$ is not zero, a 2-tap FIR filter with one pre-cursor tap may have non-minimum phase characteristics and may be used as a phase equalizer in particular embodiments. In particular embodiments, the phase-equalize level of the 2-tap FIR filter is associated with the magnitude $|C_{-1}|$. When $C_{-1}$ is zero, the pre-cursor tap is disabled and the 2-tap FIR filter has minimum phase characteristics, which does not equalize the phase distortion. As the magnitude $|C_{-1}|$ increases, the phase-equalize level increases.

Similarly, a 3-tap FIR filter with one pre-cursor tap as FIG. 3 illustrates may have the following transfer function in the discrete-time domain:

$$G(z) = C_{-1} + C_0 \cdot Z^{-1} + C_1 \cdot Z^{-2} \quad \text{EQ 2}$$
$$= \frac{C_{-1}\left(Z^2 + \frac{C_0}{C_{-1}}Z + \frac{C_1}{C_{-1}}\right)}{Z^2}$$
$$= \frac{C_{-1}(Z-z_1)(Z-z_2)}{Z^2}$$

As an example and not by way of limitation, the transfer function EQ2 may have one zero at $z_1$, another zero at $z_2$, and two poles at the origin. Either $z_1$ or $z_2$ is outside the unit circle in the z plane if $|C_0|>|C_{-1}|+|C_1|$, where $C_0$ is the cursor tap. Therefore, as long as $C_{-1}$ is not zero, a 3-tap FIR filter with one pre-cursor tap may have non-minimum phase characteristics and may be used as a phase equalizer in particular embodiments. The phase-equalize level of the 3-tap FIR filter in FIG. 3 may be associated with the magnitude $|C_{-1}|$. When $C_{-1}$ is zero, the pre-cursor tap is disabled and the 3-tap FIR filter has minimum phase characteristics, which does not equalize the phase distortion. As the magnitude $|C_{-1}|$ increases, the phase-equalize level increases.

Figure 21:
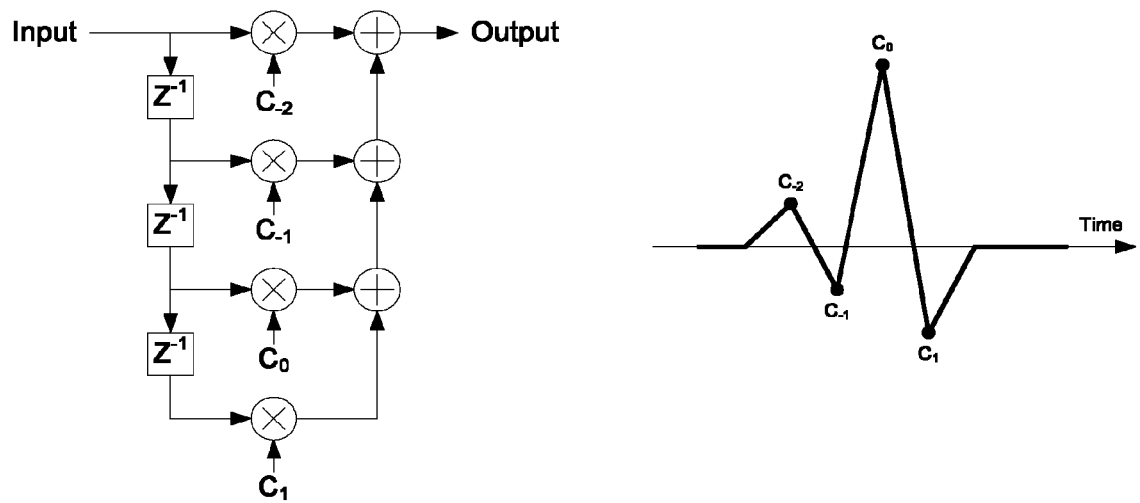
FIG. 21 illustrates an example 4-tap FIR filter with two pre-cursor taps.

A 4-tap FIR filter with two pre-cursor taps as FIG. 21 illustrates as an example and not by way of limitation may have non-minimum phase characteristics and may be used as a phase equalizer as long as $C_{-1}$ or $C_{-2}$ is not zero. When $C_{-1}$ and $C_{-2}$ are both zero, the pre-cursor taps are disabled, and the 4-tap FIR filter has minimum phase characteristics which does not equalize the phase distortion. As the magnitude of $|C_{-1}|$ and/or $|C_{-2}|$ increases, the phase-equalize level increases. $|C_{-2}|$ is associated with phase equalization in lower frequency than $|C_{-1}|$.

Figure 22:
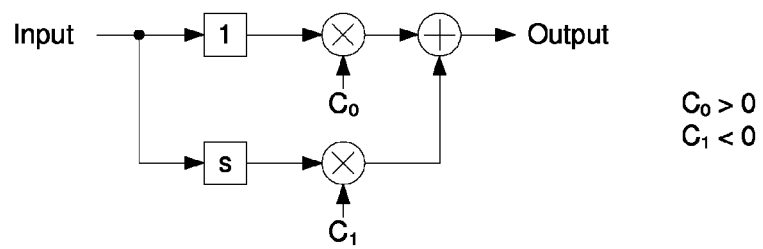
FIG. 22 illustrates an example first-order continuous-time linear equalizer (CTLE) for a phase equalizer.

In particular embodiments, a CTLE may be used as a phase equalizer if zero in the continuous-time domain is on the right half of the s plane. FIG. 22 illustrates an example first-order CTLE for a phase equalizer with the following transfer function:

$$G(s) = C_0 + C_1 \cdot s = \frac{C_1\left(s - \left(-\frac{C_0}{C_1}\right)\right)}{1} \quad \text{EQ 3}$$

In particular embodiments, the transfer function EQ3 may have one zero at $$-\frac{C_0}{C_1}.$$

If $C_0>0$ and $C_1<0$, the zero is on the right half of s plane, this CTLE may have non-minimum phase characteristics, and may be used as a phase equalizer.

The example first-order CTLE of FIG. 22 is different from a common first order CTLE for data transmission, with $C_0>0$ and $C_1>0$. Since the zero is on the left half of plane under such conditions, the common first order CTLE for data transmission may have the zero on the left half of s plane and minimum-phase characteristics, being unable to be used as a phase equalizer in particular embodiments.

Figure 23:
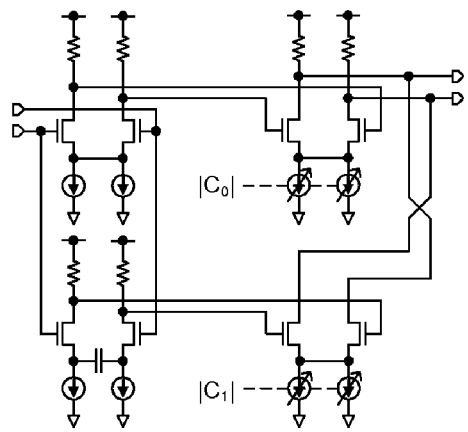
FIG. 23 illustrates an example implementation of an example first-order CTLE for an example phase equalizer
Figure 24:
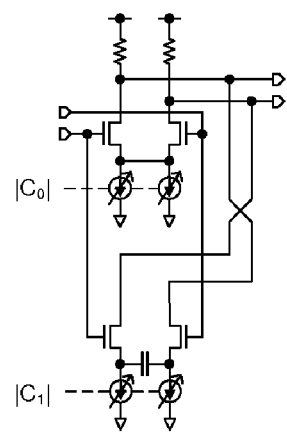
FIG. 24 illustrates another example implementation of an example first-order CTLE for an example phase equalizer.

FIG. 23 and FIG. 24 illustrate example implementations of an example first-order CTLE for an example phase equalizer (such as the phase equalizer in FIG. 22). Since the DC path and the first-order derivative path may have opposite polarity, particular embodiments may use separate signal paths and cross connect at the output. The gain stage may be separate (as FIG. 23 illustrates) or merged (as FIG. 24 illustrates).

Figure 25:
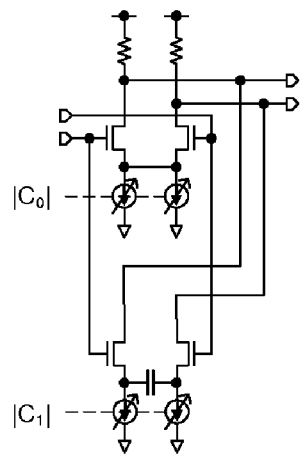
FIG. 25 illustrates an example first-order CTLE.
Figure 26:
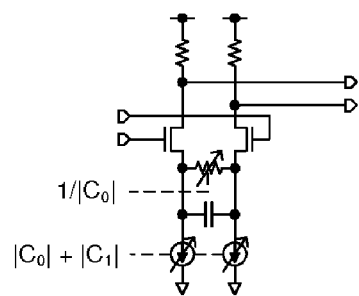
FIG. 26 illustrates another example first-order CTLE.

FIG. 25 and FIG. 26 illustrate example first-order CTLEs, wherein the DC path and the first order derivative path have the same polarity. In FIG. 26, the DC path and the first order derivative path may be merged because of the same polarity. Due to the minimum phase characteristics, the first-order CTLEs in FIG. 25 and FIG. 26 cannot be used as phase equalizers in particular embodiments.

Figure 27:
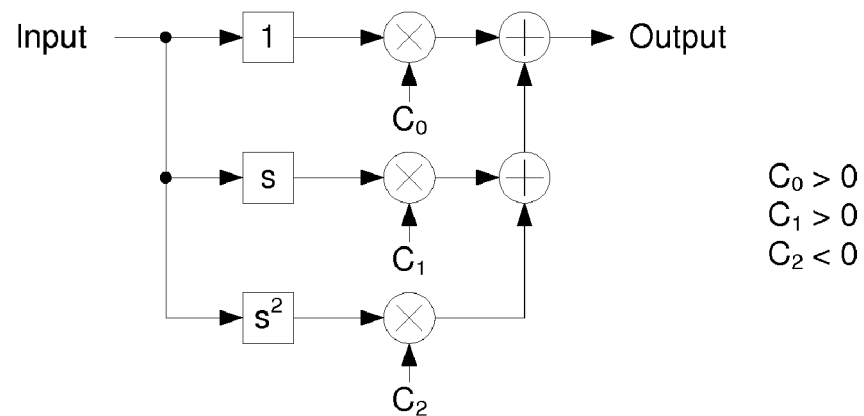
FIG. 27 illustrates an example second-order CTLE for an example phase equalizer.

FIG. 27 illustrates an example second-order CTLE for an example phase equalizer with the following transfer function:

$$G(s) = C_0 + C_1 \cdot s + C_2 \cdot s^2 \quad \text{EQ 4}$$
$$= \frac{C_2\left(s^2 + \frac{C_1}{C_2}s + \frac{C_0}{C_2}\right)}{1}$$
$$= \frac{C_2(s-z_1)(s-z_2)}{1}$$

In particular embodiments, the transfer function may have one zero at $z_1$ and another zero at $z_2$. Either $z_1$ or $z_2$ is on the right half plane of s plane if $C_0>0$, $C_1>0$, and $C_2<0$. The CTLE in FIG. 27 has non-minimum phase characteristics and may be used as a phase equalizer in particular embodiments. The CTLE in FIG. 27 is different from other second-order CTLEs for data transmission, where $C_0>0$, $C_1>0$, and $C_2>0$. With both $z_1$ and $z_2$ on the left-half of the s plane, other second-order CTLEs for data transmission have minimum-phase characteristics and cannot be used as phase equalizer in particular embodiments.

Figure 28:
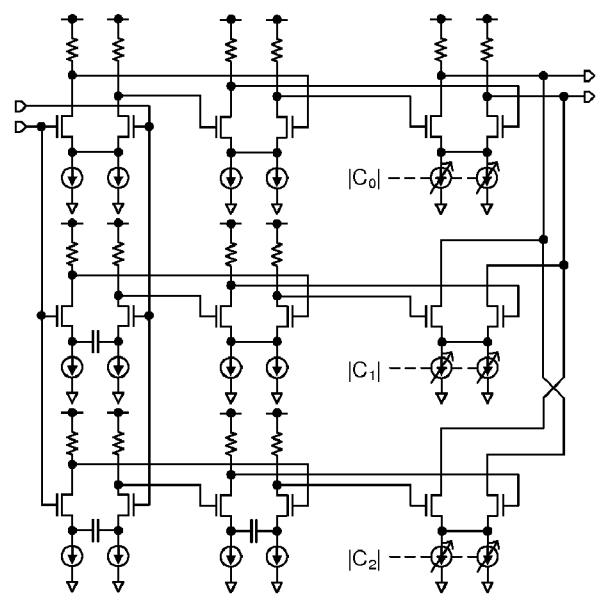
FIG. 28 illustrates an example implementation of an example second-order CTLE for an example phase equalizer.
Figure 29:
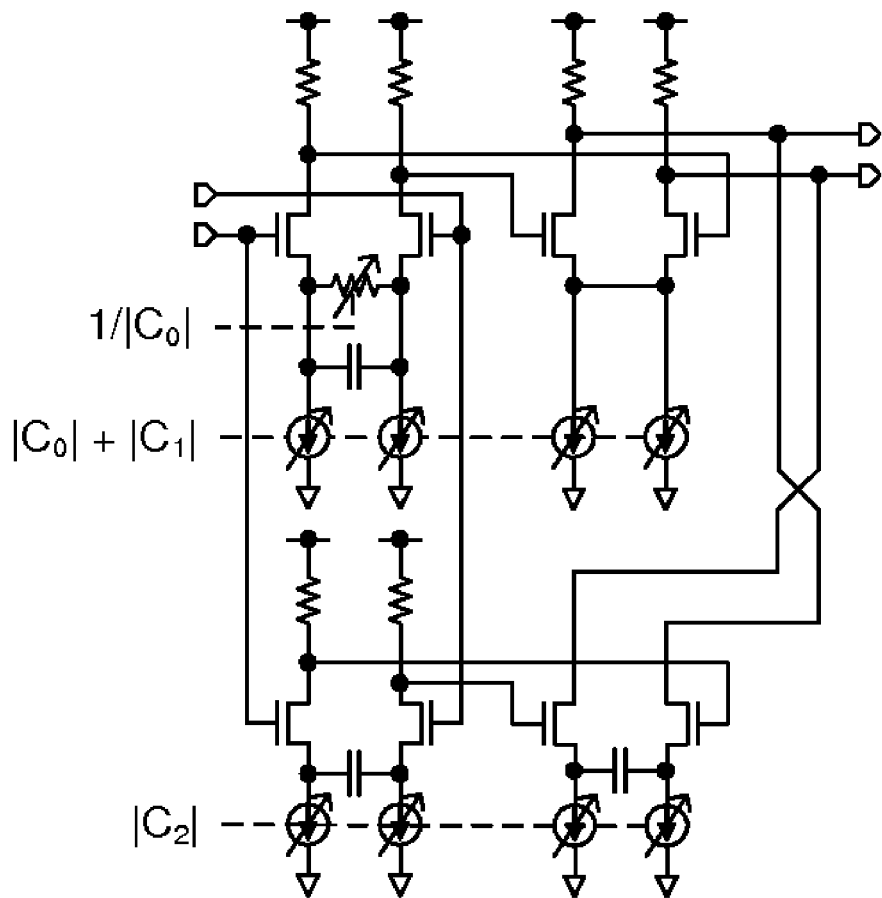
FIG. 29 illustrates another example implementation of an example second-order CTLE for an example phase equalizer.

FIG. 28 and FIG. 29 illustrate example implementations of an example second-order CTLE for an example phase equalizer (such as the phase equalizer of FIG. 27). Particular embodiments may separate the DC path, the first-order derivative path, and the second-order derivative path, as FIG. 28 illustrates. Particular embodiments may merge the DC path and the first order derivative path, as FIG. 29 illustrates, as the DC path and the first-order derivative path have the same polarity. The gain stage may be separated (as FIG. 28 illustrates) or merged with the derivative stage (as FIG. 29 illustrates).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

I claim:

1. A system comprising:
    a decision feedback equalizer (DFE) configured to:
        receive a first signal comprising transmitted data; and
        adjust the first signal to an equalized signal comprising the transmitted data;
    a phase-error detector configured to:
        detect phase errors at a data rate of no more than one fourth of a data rate for the transmitted data; and
        generate a phase-error level based on the detected phase errors;
    a clock-recovery circuit for the DFE and the phase-error detector configured to recover a data clock signal associated with the transmitted data based on the phase-error level and an error clock signal; and
    an error detector configured to generate an error signal based on the error clock signal and the first signal, and
    wherein the phase error detector is configured to receive the error signal from the error detector and the output from the DFE.

2. The system of claim 1, wherein the phase-error detector comprises one or more filter-pattern decoders (FPDs).

3. A method comprising:
    receiving by a decision feedback equalizer (DFE) a first signal comprising a transmitted data;
    adjusting by the DFE the first signal to an equalized signal comprising the transmitted data;
    detecting by a phase-error detector phase errors at a data rate of no more than one fourth of a data rate for the transmitted data;
    generating by the phase-error detector a phase-error level based on the detected phase errors;
    recovering, by a clock-recovery circuit for the DFE and the phase-error detector, a data clock signal associated with the transmitted data based on the phase error level and an error clock signal;
    generating by an error detector an error signal based on the error clock signal and the first signal; and
    receiving, by the phase error detector, the error signal from the error detector and the output from the DFE.

4. The method of claim 3, wherein the phase-error detector comprises one or more filter-pattern decoders (FPDs).

5. A system comprising:
    means for receiving a first signal comprising transmitted data;
    means for adjusting the first signal to an equalized signal comprising the transmitted data;
    means for detecting phase errors at a data rate of no more than one fourth of a data rate for the transmitted data;
    means for generating a phase-error level based on the detected phase errors; and
    means for recovering a data clock signal associated with the transmitted data based on the phase-error level and an error clock signal; and
    means for generating an error signal based on the error clock signal and the first signal, and
    wherein the means for detecting phase errors comprises means for receiving the error signal from the means for detecting errors and means for receiving the output from the DFE.

6. The system of claim 5, wherein the means for detecting phase errors at a data rate of no more than one fourth of a data rate for the transmitted data comprise one or more filter pattern decoders (FPDs).

* * * * *